(12) United States Patent
Kruhoffer et al.

(10) Patent No.: US 9,404,538 B2
(45) Date of Patent: Aug. 2, 2016

(54) SLIP-FREE ROLLING BEARING

(71) Applicant: Schaeffler Technologies AG & Co. KG, Herzogenaurach (DE)

(72) Inventors: Wolfram Kruhoffer, Aurachtal (DE); Jorg Binderszewsky, Erlangen (DE); Jorg Loos, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/782,869

(22) PCT Filed: Aug. 7, 2014

(86) PCT No.: PCT/DE2014/200389
§ 371 (c)(1),
(2) Date: Oct. 7, 2015

(87) PCT Pub. No.: WO2015/021983
PCT Pub. Date: Feb. 19, 2015

(65) Prior Publication Data
US 2016/0047417 A1 Feb. 18, 2016

(30) Foreign Application Priority Data
Aug. 12, 2013 (DE) .......................... 10 2013 215 837

(51) Int. Cl.
*F16C 33/58* (2006.01)
*F16C 19/26* (2006.01)
*F16C 25/08* (2006.01)
*F16C 27/06* (2006.01)

(52) U.S. Cl.
CPC ............... *F16C 33/585* (2013.01); *F16C 19/26* (2013.01); *F16C 25/08* (2013.01); *F16C 27/066* (2013.01); *F16C 2300/14* (2013.01); *F16C 2360/31* (2013.01)

(58) Field of Classification Search
CPC ..... F16C 25/083; F16C 27/066; F16C 33/585
USPC .................... 384/535, 536, 581, 582
See application file for complete search history.

(56) References Cited

U.S. PATENT DOCUMENTS

| | | | | |
|---|---|---|---|---|
| 1,327,026 A | * | 1/1920 | Dabbs | F16C 27/04 29/898.063 |
| 1,356,766 A | * | 10/1920 | Hindle | F16C 27/04 384/581 |
| 1,557,848 A | * | 10/1925 | Kirner | F16C 9/04 384/581 |

(Continued)

FOREIGN PATENT DOCUMENTS

| | | |
|---|---|---|
| DE | 328471 | 10/1920 |
| DE | 1955238 | 6/1970 |

(Continued)

*Primary Examiner* — Phillip A Johnson
(74) *Attorney, Agent, or Firm* — Volpe and Koenig, P.C.

(57) ABSTRACT

A slip-free rolling bearing (1) is provided, in the outer ring (3) of which there is formed an encircling groove (7). The rolling bodies (2) of this rolling bearing are surrounded, in the manner of an envelope circle, by a central ring (8) and are in physical contact therewith. To ensure permanent drive of the rolling bodies, the central ring is inserted into the groove so as to be radially free but is fixed rotationally fixedly in said groove, wherein a radial depth of the groove is greater than a thickness of the central ring. The rotational fixing of the central ring in the groove of the outer ring is effected by a spring element.

7 Claims, 3 Drawing Sheets

(56) References Cited

U.S. PATENT DOCUMENTS

| | | | | |
|---|---|---|---|---|
| 2,283,839 | A | * | 5/1942 | Wright .................. F16C 27/066 384/536 |
| 2,986,432 | A | * | 5/1961 | Schlauch .............. F16C 27/066 384/536 |
| 3,093,427 | A | * | 6/1963 | Vasta ...................... F16C 19/10 384/536 |
| 7,478,952 | B2 | * | 1/2009 | Faust ...................... F16C 27/04 384/535 |
| 8,210,754 | B2 | | 7/2012 | Endres et al. |

FOREIGN PATENT DOCUMENTS

| | | | |
|---|---|---|---|
| DE | 102005033356 | | 1/2007 |
| DE | 102006029348 | | 1/2008 |
| DE | 102006042676 | | 3/2008 |
| DE | 102006055027 | | 5/2008 |
| DE | 102007062391 | | 6/2009 |
| FR | 2191652 | A5 * | 2/1974 ............ F16C 27/066 |

* cited by examiner

SLIP-FREE ROLLING BEARING

FIELD OF THE INVENTION

The invention relates to a rolling bearing, in particular, cylindrical roller bearing, which has rolling bodies that are also driven outside of the load zone of the rolling bearing.

BACKGROUND

For the rotating support, for example, of a shaft, it is generally typical to provide rolling bearings that have an inner ring, an outer ring surrounding the inner ring coaxially, and rolling bodies that roll on raceways provided by the outer ring and the inner ring. Due to manufacturing tolerances, however, in practice it cannot be ruled out that rolling bearings have minimal play. This play can have the result that the rolling bodies, which in an ideal, completely play-free rolling bearing are in constant contact with the two raceways and therefore are driven constantly for rotation, for example, of the inner ring relative to the outer ring, lose contact with one of the raceways and consequently are no longer driven. This loss of contact of the rolling bodies with the raceway always occurs outside of the load zone of the rolling bearing. Only for the sake of completeness is it noted that a load zone of a rolling bearing is considered the part of the bearing circumference at which the rolling bodies transfer forces. If the rolling bodies lose contact with the raceway outside of the load zone, the kinematic energy that the rolling bodies have received while rolling through the load zone is reduced by effects of friction and the rotational speed is reduced. This phenomenon occurs especially in slowly rotating rolling bearings and/or rolling bearings with large diameters, because in these rolling bearings the dwell time of the rolling bodies outside of the load zone is comparatively large.

Then if the rolling bodies somewhat decelerated by the lack of raceway contact appear back in the load zone, the rotational speed of the rolling bodies is abruptly increased again due to the contact of the rolling bodies with the raceway. This increase of rotational speed then leads to sliding friction between the raceway and rolling bodies, which decreases the service life of the rolling bearings.

From DE 1 955 238 U, a rolling bearing is known in which elastic elements provide for the freedom of play in the bearing. Here, elastic elements such as rubber rings can be arranged either on the rolling bodies or on a bearing ring. If the elastic elements are located on a bearing ring, then additional expansion rings can be provided that are loaded with a force by the elastic elements and contact the rolling bodies.

Another rolling bearing formed as a cylindrical roller bearing is known from DE 10 2006 042 676 A1. In this case, tensioning elements are constructed as arc segments that extend, for example, over an angle of 90° or 120° on the circumference of the rolling bearing and are loaded by other elements, namely pressure pieces formed as pegs and annular springs with a force acting in the radial direction of the bearing.

Another known approach for provided freedom from play in a cylindrical roller bearing is the use of hollow rollers. From DE 10 2006 055 027 A1, the use of hollow rollers for a cylindrical roller bearing with a rolling body cage is known. To force the rotation of the rolling body cage with kinematically correct rotational speed in any load state, some rolling bodies of the bearing are replaced by hollow rollers that have, in the unloaded state, a slightly larger diameter than the other solid cylindrical rollers. Due to the hollow rollers located with pre-tensioning in the bearing, the cage is carried along at very low loads, but a kinematically ideal movement of the other rolling bodies is not simultaneously produced. Incidentally, the loading capacity of the rolling bearing by the hollow rollers being used is reduced in comparison to a cylindrical roller bearing that has only solid rollers.

A hollow roller with higher radial loading capacity is known from DE 10 2007 062 391 A1. Here, an overload body that ensures that the material loading of the hollow roller remains in a permissible range is arranged within the actual hollow roller.

SUMMARY

The invention is based on the objective of disclosing a rolling bearing, in particular, cylindrical roller bearing, which is improved relative to the cited prior art and in which freedom from play is produced in an especially simple and effective way.

This object is achieved by a rolling bearing with one or more features of the invention. The rolling bearing is preferably constructed as a radial bearing, in particular, a radial cylindrical roller bearing; however, it could also be a pendulum roller bearing, for example.

The rolling bearing comprises two bearing rings each of which have a running surface for rolling bodies, in particular, cylindrical rollers. The bearing rings are called outer ring and inner ring without limiting generality. In actuality, the part designated as outer ring could also be, for example, a housing in which a hole is located that directly forms the running surface for the rolling bodies. The part designated as inner ring can be, for example, a solid or hollow shaft. In all cases, the rolling bearing is suitable for transferring radial forces between the inner ring and the outer ring.

To produce the desired, play-free contact between all rolling bodies of a rolling bearing and its two raceways, at least one completely closed middle ring is provided that has an axial length that is reduced relative to the axial extent of the rolling bodies and surrounds all of the rolling bodies like an envelope circle. In this way, the middle ring that can be formed very easily from a tube section or a sheet ring creates another raceway that is used by itself for driving all of the rolling bodies of the rolling bearing and is positioned regardless of whether the rolling bodies of the rolling bearing are inside or outside the load zone of the rolling bearing. This drive of all rolling bodies by the middle ring or middle rings ensures that the middle ring or middle rings are decoupled radially from the surrounding outer ring but are simultaneously rotationally locked in it. This radial decoupling is created essentially by at least one circumferential groove that is formed in the inner side of the outer ring and its axial extent is greater than the axial length of the middle ring and its radial depth is greater than the thickness of the middle ring. The one-piece construction of the middle ring and its free radial movement ensure that the rolling bodies can always roll on the middle ring independent of the installation position of the rolling bearing or the position of the load zone, also without the need for additional components, and thus its rotational speed is maintained from the exit from the load zone until reentry into the load zone.

Only for the sake of completeness it shall be noted that the designation middle ring is not necessarily associated with a central position in the bearing. Such a middle ring could also be provided close to one or also both axial ends of the rolling bodies.

A very simple, rotationally locked fixing of the middle ring in the groove is given if there is at least one projection provided on the middle ring or in the groove, wherein this projection engages in a pocket that has a complementary shape to the projection on the middle ring or in the groove.

The assembly of the rolling bearing is simplified if each projection extends in the axial direction and engages in a pocket similarly extending in the axial direction.

Only for the sake of completeness it shall be noted that regardless of whether the projections and pockets extend in the axial or radial direction and the radial extent of the projections and pockets is adjusted to each other such that it is always possible to completely receive the middle ring in the groove in the radial direction.

The smooth running of the rolling bearing is improved if a radially flexible spring element that centers the middle ring in the load-free state of the rolling bearing is placed in the groove.

It is especially preferred if the spring element is formed by an O-ring made from an elastomer. Because the O-ring is made, for example, from rubber or an artificial elastomer, the smooth running of the rolling bearing is improved not only by the damping effect of the elastomer, but also a sufficiently large friction-fit fixing of the middle ring in the outer ring is simultaneously caused by the contact between the O-ring and the middle ring.

Rolling bearings according to the invention can also be used at high temperatures of the rolling bearing or environment if the spring element is formed from a circumferential, corrugated, or serrated metal band.

The rotationally locked fixing of the middle ring is improved if the middle ring and/or the groove is provided with edges and these edges form a support for the spring elements in the circumferential direction.

The rolling bearing according to the invention is suitable, in particular, for large size bearings like those used, for example, in wind turbines.

BRIEF DESCRIPTION OF THE DRAWINGS

An embodiment of the invention is described in more detail below with reference to a drawing. Shown herein are.

DETAILED DESCRIPTION OF THE PREFERRED EMBODIMENTS

Figure 1:
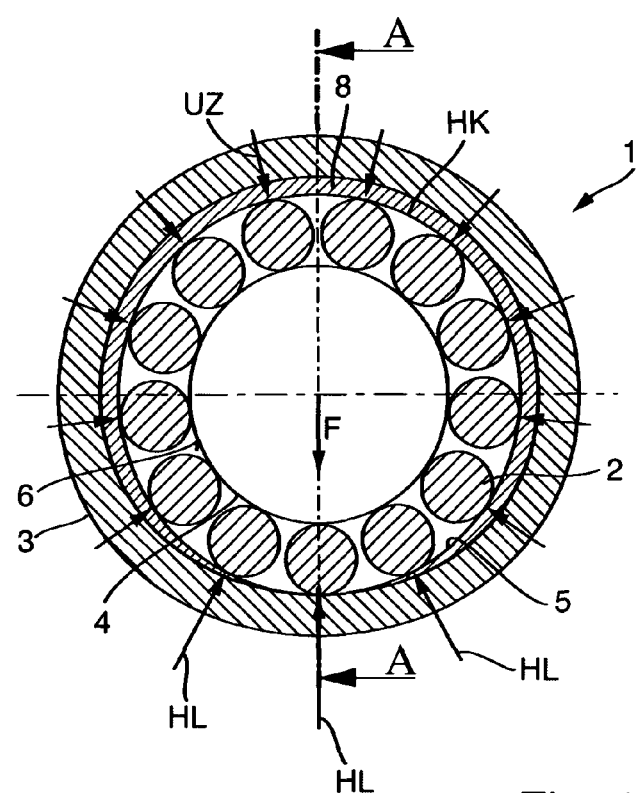
FIG. 1 a section diagram of a rolling bearing.

FIG. 1 shows, in cross section, a rolling bearing 1 that is formed as a cylindrical roller bearing and whose rolling bodies 2, namely cylindrical rollers, roll between an outer ring 3 and a shaft 4. Together the outer ring 3 and the shaft 4, at whose position a non-solid part, namely an inner ring, could also be arranged, are designated bearing rings 3, 4. With respect to the basic function of the cylindrical roller bearing 1, the prior art cited above is referenced.

The rolling bodies 2 contact both bearing rings 3, 4 in a main load zone HL, at the bottom in the arrangement according to FIG. 1. The raceways on the outer ring 3 and on the shaft 4, which is called, in general, inner ring, are marked with the reference symbols 5 and 6, respectively. A radial force acting on the shaft 4 is designated F.

Figure 2:
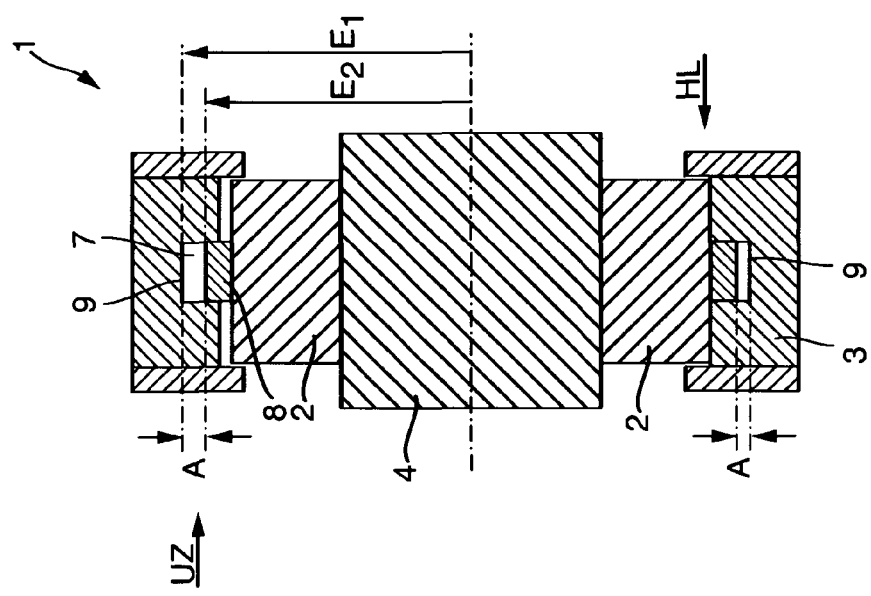
FIG. 2 a section AA through a rolling bearing according to FIG. 1.

Outside of the main load zone HL, in an unloaded zone UZ, the rolling bodies 2 are on the shaft 4 due to the force of gravity, while they are somewhat spaced apart from the outer ring 3. In order to nevertheless move all of the rolling bodies 2 of the rolling bearing 1 continuously at the kinematic rotational speed, there is, in a groove 7 that can be seen in FIG. 2 and is arranged centrally in the axial direction in the outer ring 3, a middle ring 8 that surrounds the rolling bodies 2 like an envelope circle HK. In a way that is not shown, the rolling bodies 2 are guided in a cage.

Because all rolling bodies 2—as shown in FIG. 1—contact the middle ring 8 in this embodiment, these are also driven by rolling on the middle ring 8 when the shaft 4 rotates relative to the outer ring 3, regardless of whether the rolling bodies 2 are in the main load zone HL or in the unloaded zone UZ. This is achieved in that the middle ring 8 contacts the rolling bodies 2 without clearance and the middle ring 8 is free from the outer ring 3 of the rolling body 2 in the radial direction. This can be seen in FIG. 2 how the radial clearance of the middle ring 8 relative to the outer ring 3 is achieved in that the radial extent E1 of the groove 7 is greater relative to the radial extent E2 of the middle ring 8 and much greater so that the groove is suitable for completely holding the middle ring 8. Maintaining these relationships, that is, the complete holding of the middle ring 8 in the groove 7 is especially important in the main load zone HZ of the rolling bearing 1, so that only the rolling bodies 2 "bear weight" there, that is, forces from the inner ring 4 onto the part of the outer ring 3 that has no groove. This radial clearance of the middle ring 8 that has a circular construction also means, however, that in comparison to the main load zone HL, the middle ring 8 can also assume a greater distance A to the groove base 9 in the unloaded zone UZ due to its extension on the groove 7.

Figure 3:
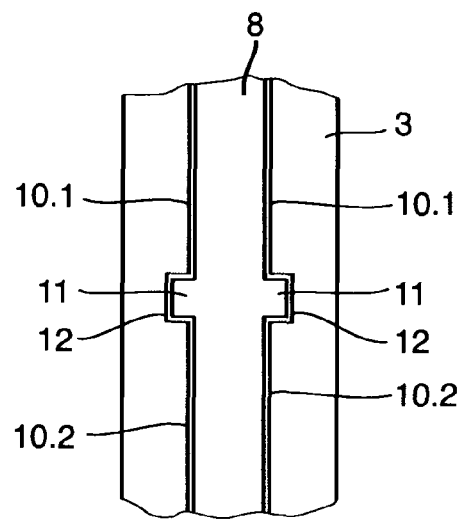
FIG. 3 a view into an outer ring.

To guarantee rolling of the rolling bodies 2 on the outer ring 3, it is important that the middle ring 8 is arranged rotationally locked despite its radial clearance relative to the outer ring 3. A simple construction of a rotationally locked fit is shown in FIG. 3, which has a view into an outer ring 3 of a rolling bearing 2 according to the invention for its object. The middle ring 8 is provided in this embodiment on each of its two edges 10.1 with a projection 11 that extends in the axial direction and engages in pockets 12 that have complementary shapes to the projections 11 and are constructed in the two edges 10.2 of the groove 7. Due to the rolling of the rolling bodies 2 on the middle ring 8 placed in the groove 7, the middle ring 8 is exposed to driving forces in the circumferential direction of the rolling bearing 2 and these forces impose a co-rotation of the middle ring 8 relative to the outer ring 3 thanks to the complementary shapes of the projections 11 and pockets 12. It can also be seen in the diagram according to FIG. 3 that the axial width of the middle ring 8 is somewhat reduced relative to the axial width of the groove, in order to rule out jamming of the middle ring 8 in the groove 7.

Figure 4:
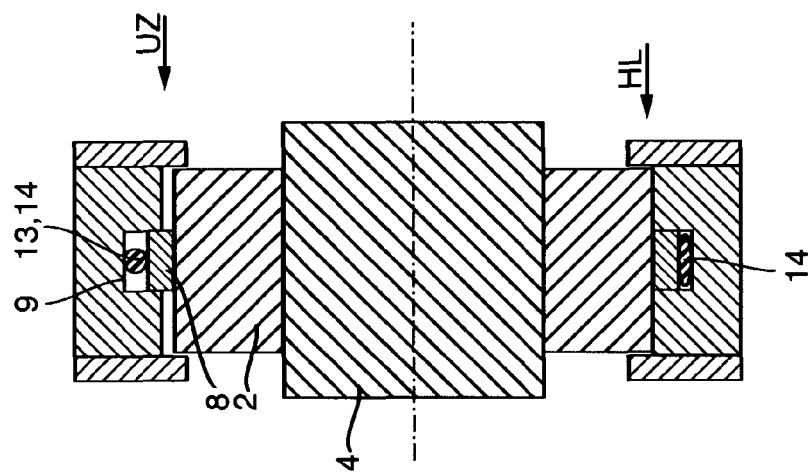
FIG. 4 another construction of a rolling bearing in a diagram according to FIG. 2, FIG. 5 a fixed O-ring, and FIG. 6 another construction of a spring element.

Corresponding to the construction according to FIG. 4, co-rotation of the middle ring 8 is prevented by a spring element 13 in the groove 7 between the middle ring 8 and the groove base 9. This spring element 13 is formed as an O-ring 14. The O-ring 14, which is placed in the groove 7 and can be made from rubber or a plastic elastomer, has the effect by itself, due to the slip-inhibiting action of such materials, that the middle ring 8 is fixed rotationally locked in the groove 7.

It can also be seen from the construction according to FIG. 4 that the O-ring 14 fills out the space between the middle ring 8 and the groove base 9 such that the O-ring 14 contacts the middle ring 8 and the groove base 9. Because the O-ring is made from elastic material and always fills out the space between the middle ring 8 and groove base 9 in the radial direction, this contributes to smooth running, regardless of whether the middle ring 8—as shown in the lower part of FIG.

4—is completely held by flattening forces of the O-ring 14 by the groove 7 or—as shown in the upper part of FIG. 4—projects somewhat from the groove 7.

Figure 5:
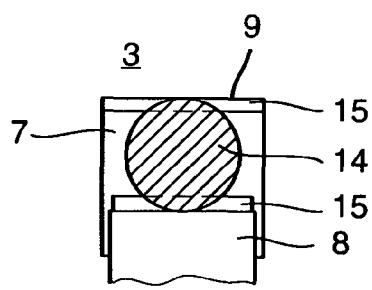

If the slip inhibition that is realized just by the O-ring 14 is not sufficient, in another embodiment shown in FIG. 5, the slip inhibition can be further improved by providing edges 15 in the groove 7 and/or on the middle ring 8. According to the construction in FIG. 4, these edges 15 are formed in the groove base 9 and on the outer lateral surface 16 of the middle ring 8, wherein the edges 15 on the middle ring 8 are pointed in the direction of the groove base 9 and the edges 15 on the groove base 9 are pointed in the direction of the middle ring 8. When the rolling bearing 1 is mounted, the edges 15—as shown in FIG. 6—are pressed into the O-ring 14 and improve, due to the serrations, the rotationally locked fit of the middle ring 8 relative to the outer ring 3.

Figure 6:
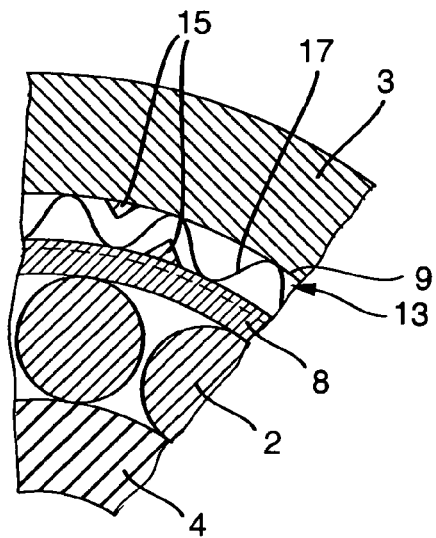

FIG. 6 shows another construction of a spring element 14. This spring element 13 is constructed as a corrugated metal spring 17 and fills the radial space between the groove base 9 and the middle ring 8. As explained in relation with the O-ring 14, the corrugated metal spring 17 does not only contribute to the smooth running of the rolling bearing 1, but also simultaneously ensures that an eccentricity of the middle ring 8 relative to the center of the outer ring 3 is absorbed elastically. The shown edges 15 that extend in the radial direction and have a contour adapted to the corrugated metal spring 17 in the embodiment shown in FIG. 6 ensure that, due to the serrations, relative rotation between the outer ring 3 and middle ring 8 is prevented.

In addition, in the embodiment according to FIG. 6, if the corrugated metal spring 17 is constructed as a standalone part, in another embodiment not shown in more detail, the spring effect of radially projecting ribs can be realized that form a one-piece unit with the middle ring 8, which further reduces the expense.

Only for the sake of completeness it shall be noted that the figures are not true-to-scale diagrams of the ratios for the object, but are merely of a schematic nature. Also, in the embodiments if only one middle ring 8 placed in a groove 7 is shown, in other—not shown—constructions, two or more combinations formed from groove 7 and middle ring 8 can be provided across the axial length of the rolling bearing 1 for driving the rolling bodies 2.

The rolling bearing 1 according to FIG. 1 or 3 can be used, in particular, in use cases in which the forces of gravity significantly influence the bearing kinematics. This is the case, for example, in large size bearings, for example, wind turbine bearings, in which the rolling bodies 2 are especially strongly decelerated outside of the load zone. Because all of the rolling bodies 2 are in physical contact with the middle ring 8 made from steel regardless of whether the rolling bodies 2 are in the main load zone HL or in the unloaded zone UZ, it is guaranteed that the rotational speed of each rolling body 2 about its own axis is approximately maintained also outside of the load zone, so that the rolling body 2 reenters the load zone of the rolling bearing 1 approximately at its kinematic rotational speed.

LIST OF REFERENCE NUMBERS

1 Rolling bearing
2 Rolling body
3 Outer ring
4 Inner ring, shaft
5 Raceway
6 Raceway
7 Groove
8 Middle ring
9 Groove base
10x Edge
11 Projection
12 Pocket
13 Spring element
14 O-ring
15 Edges
16 Outer lateral surface
17 Leaf spring
F Radial force
HL Main load zone
HK Envelope circle
UZ Unloaded zone
E1 Radial extent of groove
E2 Radial extent of middle rim
A Distance
L Length
T Depth
D Thickness

The invention claimed is:

1. A slip-free rolling bearing comprising an inner ring with a raceway,
an outer ring that surrounds the inner ring coaxially at a distance, the outer ring including a raceway
rolling bodies that roll on the raceways provided by the inner ring and the outer ring,
a completely closed middle ring that has an axial length that is reduced relative to an axial extent of the rolling bodies and contacts all of the rolling bodies as an envelope circle HK,
the outer ring has a surrounding groove having an axial extent that is greater than the axial length of the middle ring and having a radial depth that is greater than a thickness of the middle ring in a radial direction, and
the middle ring is arranged radially movable and rotationally locked in said groove.

2. The rolling bearing according to claim 1, wherein for the rotationally locked fixing of the middle ring, a positive-locking fit is provided in which at least one projection is provided on the middle ring or the groove, and said at least one projection engages in a pocket that has a complementary shape relative to the at least one projection that is located in the other of the middle ring or the groove.

3. The rolling bearing according to claim 2, wherein the at least one projection extends in the axial direction and engages in the pocket which also extends in the axial direction.

4. The rolling bearing according to claim 1, wherein a radially flexible spring element that centers the middle ring in an unloaded state of the rolling bearing is placed in the groove.

5. The rolling bearing according to claim 4, wherein the spring element is an O-ring formed from an elastomer.

6. The rolling bearing according to claim 4, wherein the spring element is formed by a surrounding, corrugated, or serrated metal band.

7. The rolling bearing according to claim 5, wherein at least one of the middle ring or the groove is provided with edges that support the spring element in a circumferential direction.

* * * * *